United States Patent
Nason

[11] Patent Number: 5,909,568
[45] Date of Patent: Jun. 1, 1999

[54] PROCESS AND APPARATUS FOR TRANSFERRING DATA BETWEEN DIFFERENT FILE FORMATS

[75] Inventor: Neville S. Nason, Indianapolis, Ind.

[73] Assignee: Apple Computer, Inc., Cupertino, Calif.

[21] Appl. No.: 08/707,246

[22] Filed: Sep. 3, 1996

[51] Int. Cl.[6] ....................................................... G06F 13/00
[52] U.S. Cl. ............................................................ 395/500
[58] Field of Search ..................................... 395/500, 309

[56] References Cited

U.S. PATENT DOCUMENTS

| | | | |
|---|---|---|---|
| 5,218,697 | 6/1993 | Chung ....................................... | 395/650 |
| 5,557,780 | 9/1996 | Edwards et al. ......................... | 395/500 |
| 5,652,876 | 7/1997 | Ashe et al. ............................... | 395/500 |
| 5,668,958 | 9/1997 | Bendert et al. .......................... | 395/308 |

OTHER PUBLICATIONS

Margret Leving et al. "WordPerfect for 6.1 for Windows for Dummies", 2nd Edition, pp. 216–222, 1994.

Unknown, "XTND Programmer's Guide", for XTND 1.3, 1991, Developer Technical Publications, Apple Computer, Inc.

*Primary Examiner*—Kevin J. Teska
*Assistant Examiner*—Ayni Mohamed
*Attorney, Agent, or Firm*—Beyer & Weaver, LLP

[57] ABSTRACT

Disclosed is a process and apparatus for transferring data between an active file being used by an application and an external file that is stored on a storage medium. The active file will preferably have a different format than the external file. The apparatus includes a primary data structure that has plurality of standard fields and an extended field. At least some of the plurality of standard fields and the extended field are preferably associated with an element of data transferred between the active file and the external file. The primary data structure will have a directive field that is set by the application when a data transfer between the files is desired. A translator configured to extract the element of data from one of the active file and external file in response to the directive field being set by the application is provided. The translator is further configured to place the extracted data into the primary data structure when the application sets the directive field to implement at least one of the plurality of standard fields, thereby operating in a standard mode. On the other hand, the translator is configured to allocate a secondary data structure and place the extracted data into the secondary data structure when the application sets the directive field to implement the extended field, and thereby operating in an extended mode.

28 Claims, 10 Drawing Sheets

PROCESS AND APPARATUS FOR TRANSFERRING DATA BETWEEN DIFFERENT FILE FORMATS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to computer implemented data transfers, and more particularly, to an improved process and apparatus for transferring data between files having different formats.

2. Description of the Related Art

In recent years, computer software technology has been growing at a very rapid pace. In order to remain competitive in this rapidly expanding industry, developers of new software applications have been including translation features in their new applications which allow users to access files created using older versions of their application. In addition to version compatibility, developers have also implemented translation features which allow users working in one application to open files created by competing applications. In fact, the ability to open files created by competing applications is critically important for developers desiring to expand the market share for their particular software product.

By way of example, developers of word processing, spreadsheet and graphics applications typically include translation capabilities as part of their commercially available products. The quality and thoroughness of an application's translation capabilities are generally rated by how well data from a file created by a competing application can be imported or otherwise converted into a file for use by the application. The same applies when data contained in a file that is currently in use is exported or otherwise stored into a file having a format associated with another application.

Because developers are constantly revising their own applications by adding new features and enhancing old features, the translation capabilities provided with one application may not be able to seamlessly translate data having new or enhanced features. Therefore, the translation capabilities provided for applications must be constantly updated to keep pace with updates and enhancements made in competing products.

FIG. 1 is a block diagram 100 identifying conventional interactions between an application 102 and a translator 108. As shown, application 102 and translator 108 are stored within a computer system's random access memory 104. Also stored in random access memory 104 is an active file 103 in the application's native format which is being manipulated by application 102. There is also shown an external file 110 which represents a file created by an application other than application 102. Typically, external file 110 is stored on a storage medium such as a disk drive.

In operation, when a user initiates an import of data from external file 110 to active file 103, for example, application 102 will allocate a block of memory for a parameter block 106, which is a data structure having a number of fields used with the import processing. Application 102 will then be able to communicate with translator 108 via parameter block 106. By way of example, application 102 typically sets a directive field (e.g., message) within parameter block 106, which indicates to translator 108 that a "data import" from external file 110 has been requested.

In word processing applications, for example, a file may have various distinguishable elements of data which may include headers, footers, footnotes, and body text. For each element of data, a multitude of attributes are used to characterize the elements of data. By way of example, attributes may identify the text length, text size, font type, text color, number of columns, margin information, etc. These attributes typically correspond to fields within parameter block 106.

As can be appreciated, as applications increase in functionality or existing functions are updated, additional fields need to be added to parameter block 106. Although continually adding new fields to an existing collection of fields of parameter block 106 works well when new attributes need to be processed by translator 108, infinitely tacking additional fields to parameter block 106 brings about undesirable consequences.

An undesirable consequence is that continually adding to parameter block 106 will generate a substantially large data structure which needs to be loaded into random access memory 104 each time a data translation is performed. Further, fields that are specific to particular file formats (e.g., a file created by MicrosoftWord®) are generally added ad hoc to parameter block 106. As a result, the entire parameter block 106 including MicrosoftWord®-specific fields must be loaded into random access memory 104 even though they are not needed for a particular data translation.

Besides having the undesirable consequence of increasing the need for random access memory 104, programmers responsible for servicing and updating parameter block 106 are faced with the exceedingly difficult task of maintaining and understanding the ad hoc additions made to parameter block 106 in response to additional features added to a competing application. Consequently, since parameter block 106 grows each time a feature is added or revised in new versions of competing applications, the sheer number of fields resulting in future versions of parameter block 106 will make it foreseeably difficult to manage and maintain. Also, this makes it difficult to maintain backward compatibility with earlier versions of products.

In fact, since additional fields of parameter block 106 are literally tacked onto an existing list of fields, there is no organizational logic to guide future programmers that are assigned the task of performing updates. As a result, when updates are performed on parameter block 106, there is no reasonable way to identify which fields have been rendered obsolete or are no longer needed. Therefore, the entire parameter block 106 will necessarily continue to grow requiring even increasing amounts of random access memory 104 and become more difficult to maintain and service.

In view of the foregoing, what is needed is a process and apparatus for transferring data between files having different formats without endlessly adding fields to a parameter block. There is also a need for a data transfer process and apparatus that efficiently uses random access memory while providing data structures that are easy to maintain and update.

SUMMARY OF THE INVENTION

Broadly speaking, the present invention fills these needs by providing a process and apparatus for transferring data between an active file being used by an application and an external file that is stored on a storage medium. The active file has a different format than the external file, yet the invention operates to convert or translate the file format during the data transfer.

The invention can be implemented in numerous ways, including as a process, an apparatus, a system, a device, a method, or a computer readable medium. Several embodiments of the invention are discussed below.

In one embodiment, an apparatus is disclosed which includes a primary data structure that has a plurality of standard fields and an extended field. At least some of the plurality of standard fields and the extended field are preferably associated with an element of data transferred between the active file and the external file. The primary data structure will have a directive field that is set by the application when a data transfer between the files is desired. The apparatus includes a translator that is configured to extract the element of data from one of the active file and external file in response to the directive field being set by the application. In this embodiment, the translator will place the extracted data into the primary data structure when the application sets the directive field to implement at least one of the plurality of standard fields, thereby operating in a standard mode. On the other hand, the translator will allocate a secondary data structure and place the extracted data into the secondary data structure when the application sets the directive field to implement the extended field, thereby operating in an extended mode.

In another embodiment, a process is disclosed which includes the operation of requesting a data transfer between the active file and the external file. Once the request is made, a translator is selected in response to the data transfer request, and in accordance with the format of the external file. The process then allocates a primary data structure that includes a plurality of standard fields and an extended field. Preferably, the plurality of standard fields and the extended field are associated with an element of data being transferred between the active file and the external file. The primary data structure includes a directive field that is set by the application when the data transfer is requested. In this embodiment, the directive field may be set in one of a standard mode and an extended mode. The process then extracts the element of data from one of the active file and external file in response to the directive field being set by the application. Next, the extracted element of data is placed into one or more standard fields of the primary data structure when operating in the standard mode. Otherwise, the process allocates a secondary data structure and places the extracted element of data into the secondary data structure when operating in the extended mode.

The advantages of the invention are numerous. One advantage of the invention is that the amount of random access memory used when implementing the secondary data structure is significantly less than would conventionally be required. In this manner, only the specific data structures needed to complete the transfer of specific data elements are temporarily loaded into memory each time the transfer is requested by the application. When that particular extended data transfer is complete, the space in memory is de-allocated thereby providing for more efficient use of random access memory and increased processing speed. In yet a further advantage, the secondary data structure is provided with version information which beneficially allows for efficient updating and maintenance.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Broadly speaking, the present invention discloses a process and apparatus for transferring data between an active file being used by an application and an external file that is stored on a storage medium. The active file has a different format than the external file, yet the invention operates to convert or translate the file format during the data transfer.

Figure 1:
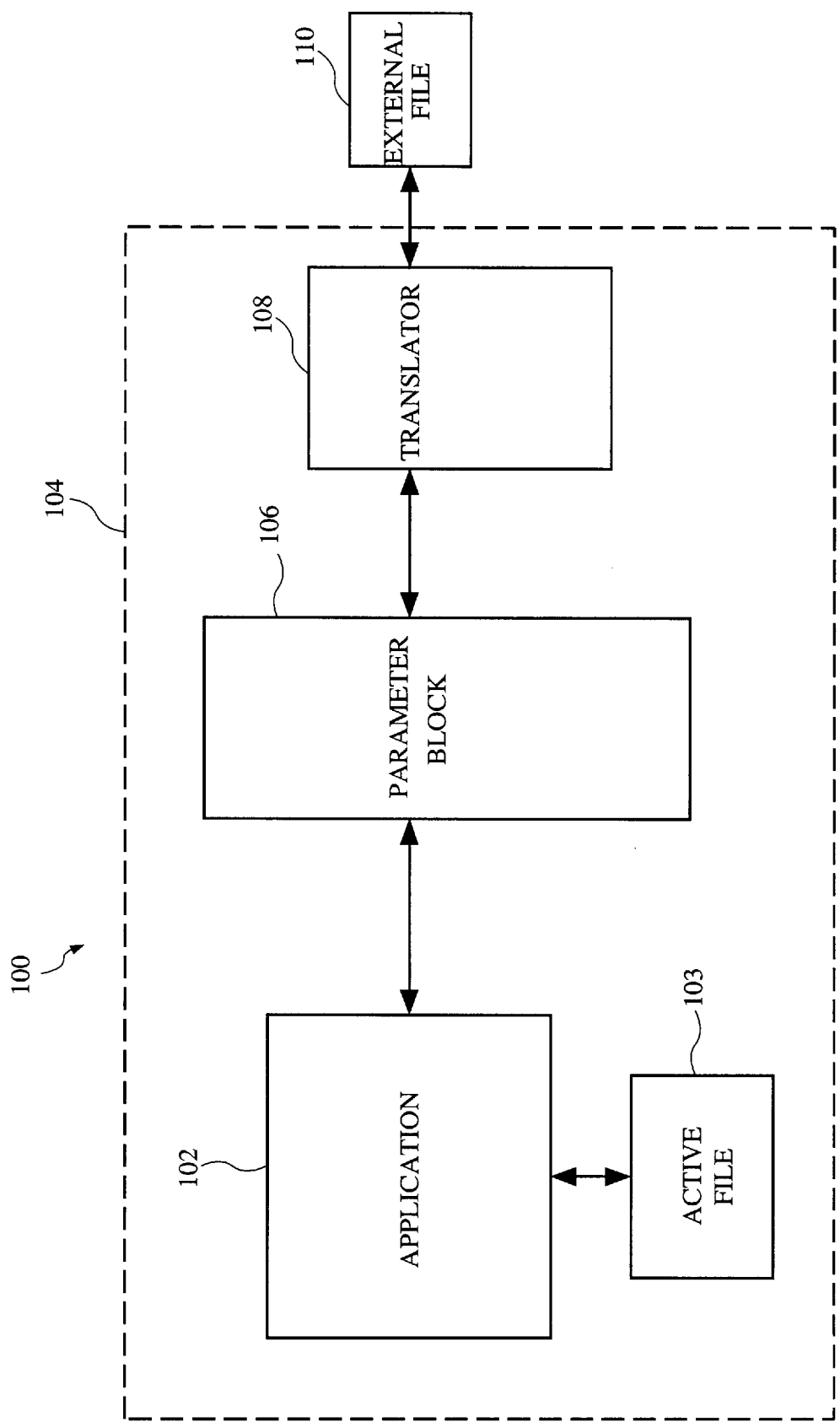
FIG. 1 is a block diagram illustrating some conventional interactions between an application and a translator during a data translation.
Figure 2A:
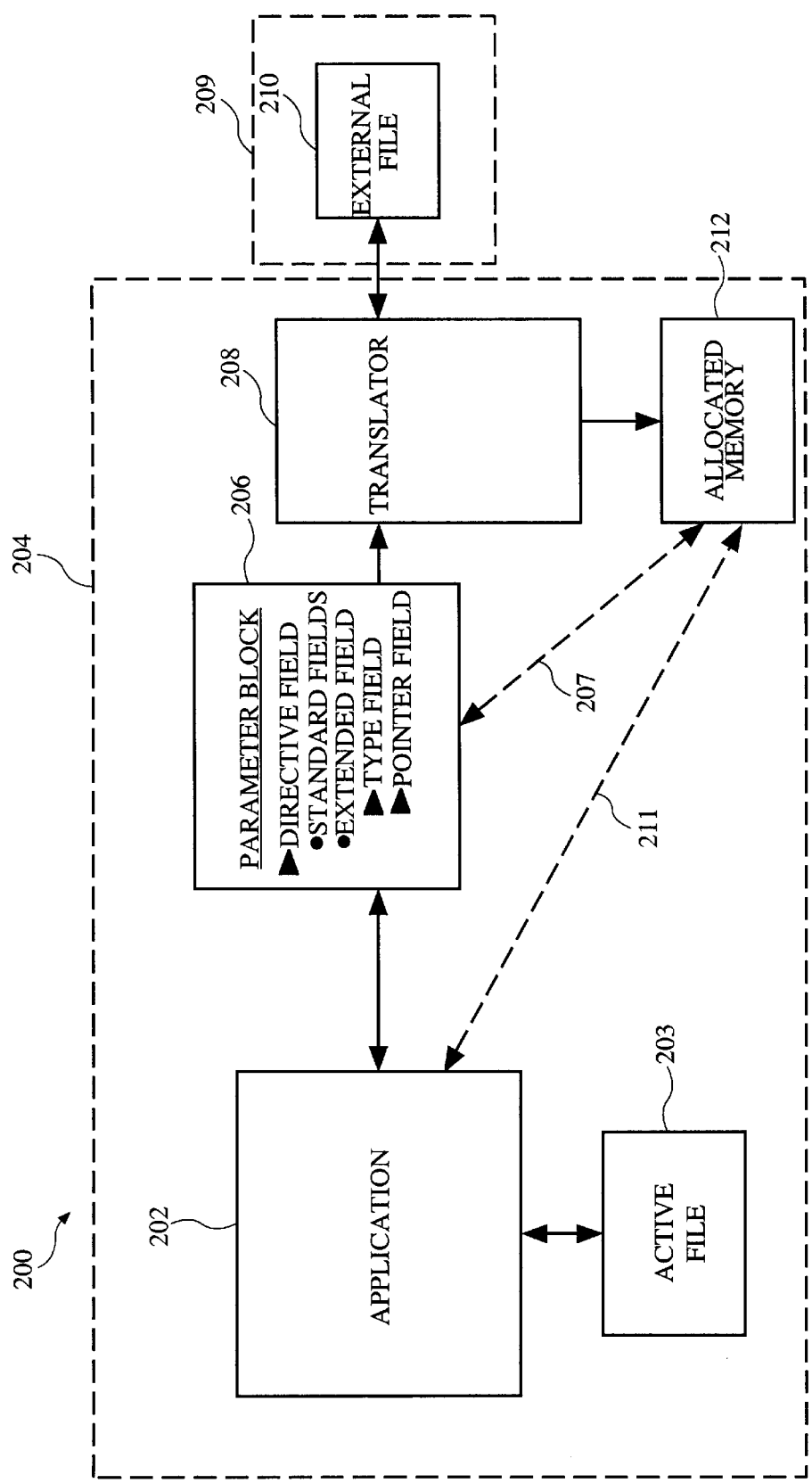
FIG. 2A is a block diagram illustrating interactions between an application and a translator in accordance with a preferred embodiment of the invention.

FIG. 2A is a diagrammatic block diagram 200 broadly illustrating the interactions between an application 202 and a translator 208 during a data transfer performed in accordance with one embodiment of the present invention. As shown, application 202, parameter block 206, translator 208, allocated memory 212, and an active file 203 are contained within a random access memory 204. An external file 210 is also illustrated interacting with translator 208. External file 210 is preferably stored on a storage medium 209 which may include a hard drive, a floppy disk or a remotely located networked server. In general, as a user is working on active file 203 (e.g., which is being manipulated by application 202), the user may request an import or an export of data between active file 203 and external file 210.

When an import or export of data is requested by application 202, and the file identified by application 202 for transfer does not have the same format, a translator 208 will be required. Translators are generally required since the files were originally created using different applications. By way of example, for word processing programs, active file 203 may have been created using ClarisWorks®J (Japanese version of ClarisWorks®), and external file 210 may have been created using MacWriteII®J (Japanese version of MacWriteII). Since these files were created using different applications that have different or additional functionalities, a translator will be required to assist in any importation or exportation of text. For illustration purposes, the invention is described with respect to Japanese-type word processing programs. However, it should be understood that the embodiments of this invention are equally applicable to other programs such as, for example, spread sheets, graphics, data base, page layout, etc. Similarly, the embodiments of this invention should not be limited to any specific language.

Figure 2B:
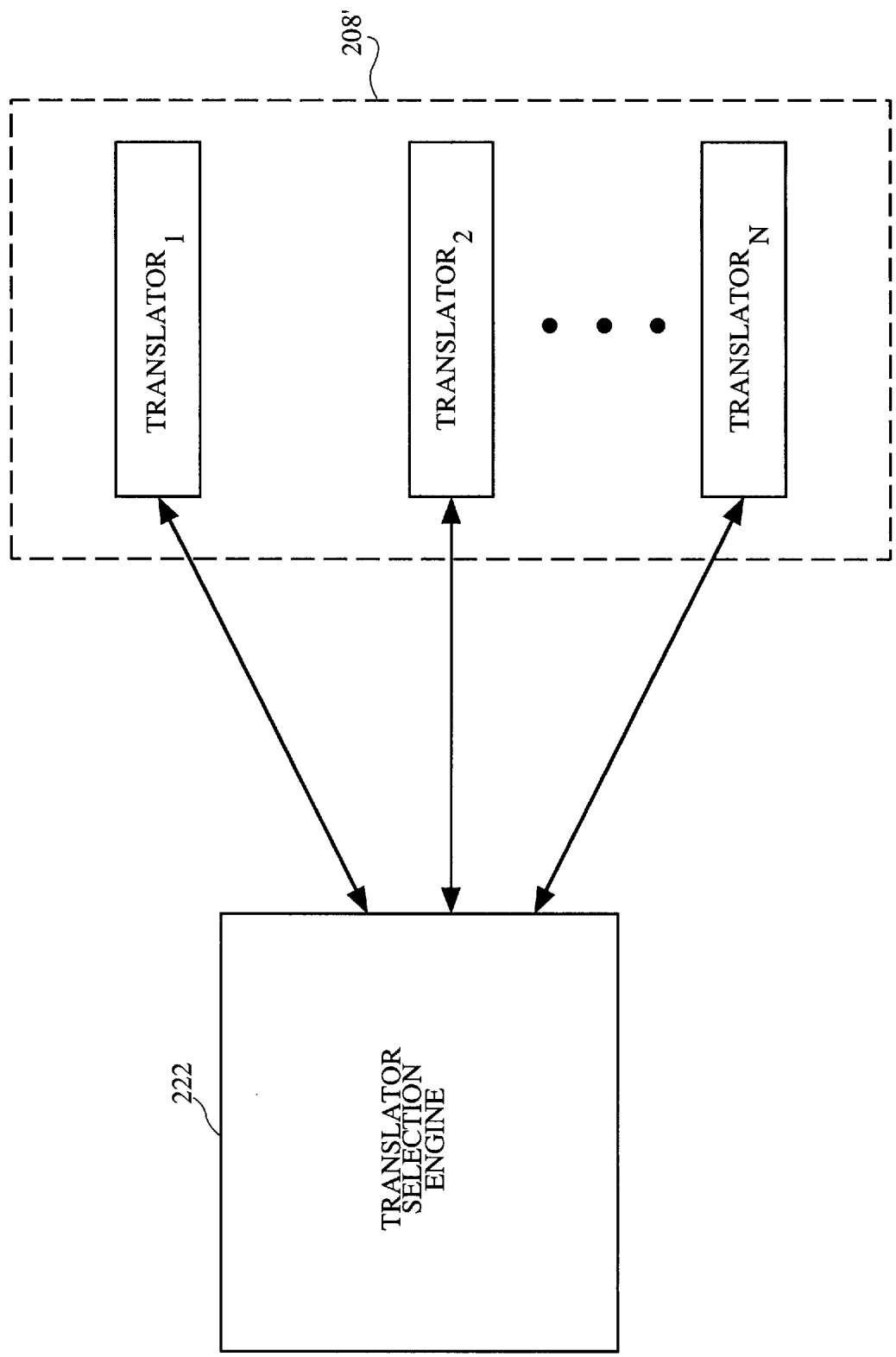
FIG. 2B is a block diagram illustrating a translator selection engine and a suite of translators used during the selection of a translator that is specific to an external file in accordance with a preferred embodiment of the invention.

When application 202 wishes to import data from external file 210, application 202 will prompt a translator selection engine 222 to be loaded into random access memory 204. As shown in FIG. 2B, translator selection engine 222 will be loaded into random access memory 204 for the purpose of selecting a translator from a suite of translators 208'. Generally, translator suite 208' is provided with an application 202 for performing such translations with respect to multiple formats. In this manner, a specific translator can be selected based on the format of external file 210. Therefore, translator 208 is specifically selected such that proper interaction is provided with external file 210. For more information on exemplary translator selection engines, reference can be made to Appendix A.

Once translator 208 has been selected as shown in FIG. 2B, application 202 will allocate a block of memory in RAM 204 for parameter block 206. As described above, parameter block 206 is preferably a data structure having a directive field, a plurality of standard fields and an extended field. The extended field will preferably have a TYPE FIELD and a POINTER FIELD. Typically, the plurality of fields that are part of parameter block 206 will identify a multitude of attributes that are used to characterize a standard subset of the data being transferred between files. In this embodiment, when an extended data transfer is requested by application 202, the TYPE FIELD will be used to characterize the data being transferred, and the POINTER FIELD is used to reference the address location in RAM 104 where the transferred data is temporarily stored during the data transfer.

Therefore, when a data transfer is requested between active file 203 and external file 210, application 202 can set a directive (i.e., message) in the directive field indicative of a data transfer request. When an "extended data" transfer is requested, e.g., external file 210 has "extended data characteristics" such as section information or table information, application 202 will set an appropriate directive indicating to translator 208 that it wishes to transfer data not supported by the standard field. Of course, these extended data characteristics are merely exemplary for word processing documents.

Therefore, when an extended data transfer directive was set in parameter block 206, "SupportFlags" were used by application 202 and translator 208 to identify what data type capabilities they support. In this manner, application 202 and translator 208 will limit their data transfer activities to the data types and capabilities that both support. The extended data transfer process will be described in greater detail below with reference to FIGS. 4 through 7.

In operation, when a directive is set requiring extended data to be imported from external file 210, the extended field will be set in accordance with the type of extended data requested. By way of example, if while implementing a word processing application, a user desires to import a table from a file created using a competitors word processing program, application 202 may set a directive such as "ImportGetTableInfo". In response to this directive, translator 208 will allocate RAM 104 (i.e., allocated memory 212) for a "TableInfo" data structure. Translator 208 will then extract the requested table data from external file 210, and fill-in the extracted table data into the appropriate fields in allocated memory 212. After the extracted table data is loaded into the secondary data structure stored in allocated memory 212, translator 208 sets the POINTER FIELD to the address containing the extracted table data (i.e., address of allocated memory 212) and sets the TYPE FIELD to indicate that table data had been returned by translator 208. Since table data was correctly transferred, translator 208 also sets the directive field in parameter block 206 to "ImportAcknowledge." Translator 208 then returns control to application 202, and application 202 checks the directive field to determine whether translator 208 changed the directive field to "ImportAcknowledge".

Next, application 202 will check whether the TYPE FIELD set by translator 208 is identical to the TYPE FIELD initially requested by application 202. If "ImportAcknowledge" was set, and the TYPE FIELD set by translator 208 matches the type of data initially requested by application 202, application 202 will use the POINTER FIELD to reference the address of the extracted data in allocated memory 212 via a data path 207. Next, application 202 will directly retrieve the data extracted from external file 210 directly via data path 211. Once the data is retrieved by application 202, it is made available to active file 203. At this point, allocated memory 212 can be de-allocated, beneficially freeing memory in RAM 204. In addition, the size of the data structure loaded into RAM 104 during a data transfer is lessened since only the data structures needed to complete the table-specific data transfer were temporarily loaded into memory.

Figure 3:
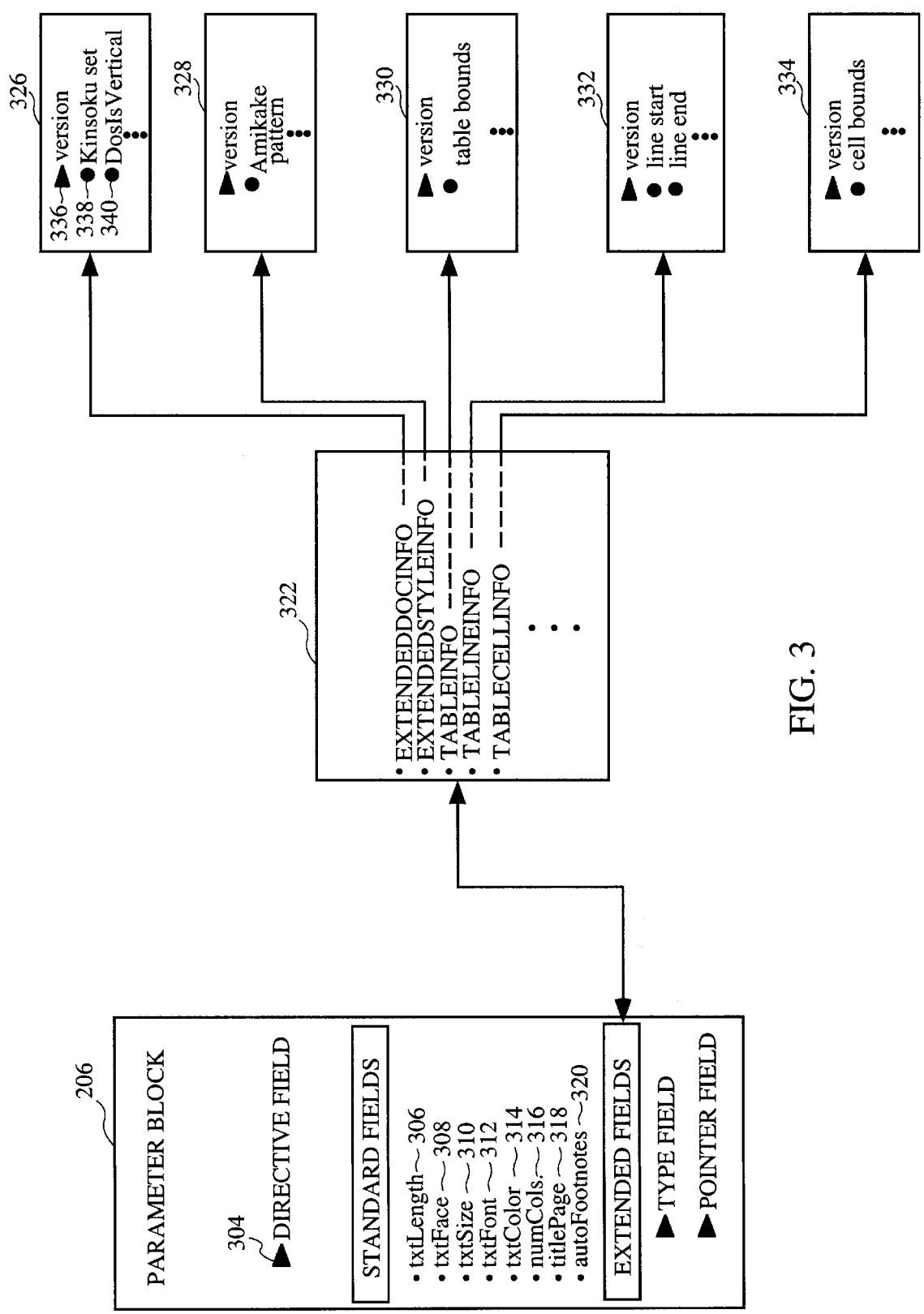
FIG. 3 is an exemplary block diagram illustrating types of fields contained within various data structures used with a preferred embodiment of the invention.

FIG. 3 is a more detailed illustration of the types of fields contained within the primary data structure of parameter block 206. Also illustrated is an enumerated value list 322, and a plurality of specific data structures 326, 328, 330, 332, and 334 which are implemented in one embodiment of the present invention. As described above, parameter block 206 will preferably have a directive field 304 (i.e., message field) which is suitable for exchanging messages between application 202 and translator 208. Also shown are a plurality of exemplary standard fields which are used to identify specific characteristics of the data being imported or exported.

By way of example, for word processing, suitable standard fields may include a text length field 306, a text face field 308, a text size field 310, a text font field 312, a text color field 314, a number of columns field 316, a title page field 318, an auto footnotes field 320, etc. These fields represent typical standard characteristics of data being imported or exported into or out of active file 203. Although the standard fields may be sufficient in certain circumstances, as new and improved data characteristics are added to applications, additional fields are required to allow for proper translation of data being imported or exported between files. These additional fields are advantageously implemented as part of the extended fields. By way of example, as Japanese word processing applications continue to improve and add new features, the number of additional fields needed to characterize the new features being imported and exported could potentially grow to unmanageable proportions.

Therefore, in this embodiment, an enumerated value list 322 is provided having a plurality of fields that broadly identify extended capabilities associated with a data import or export between files having different formats. By way of example, if special Kinsoku formatting (i.e., Japanese sentence structure rules) is required to properly import data from external file 210 into active file 203, enumerated value list 322 will be referenced and translator 208 will set the TYPE FIELD in parameter block 206 to ExtendedDocInfo. As described above, translator 208 will set up allocated memory 212 and load a specific data structure 326 to support ExtendedDocInfo.

As shown, specific data structure 326 will generally have a version field 336 which identifies the number of fields present in specific data structure 326. As described above, as additional features are added to applications in the future, it would be desirable to have a system for managing updates and identifying fields in accordance with version of the specific data structure being implemented. Therefore, when ExtendedDocInfo is called by application 202, enumerated value list 322 is referenced, and translator 208 loads specific data structure 326 into allocated memory 212. In this manner, only the specific data structures required during an extended data transfer are temporarily loaded into allocated memory 212 of RAM 104. Additionally, if the data being transferred also requires translation for vertical text, DocIsVertical field 340 can be utilized before specific data structure 326 is deallocated.

Advantageously, the above described process of allocating small segments of memory when specific extended data features are being transferred avoids continually adding fields to parameter block 206 each time a new feature needs to be translated. In other words, loading only the data structures needed for a specific data transfer avoids having to load in an extremely large parameter block each time a transfer is requested.

As illustrated, FIG. 3 is also shown having an enumerated value list 322 having values for an ExtendedStyleInfo, a TableInfo, a TableLineInfo, and a TableCellInfo. As described above, when a file being imported or exported has extended information, thereby referring to ExtendedStyleInfo in enumerated value list 322, translator 208 will load a specific data structure 328 that itemizes the additional information such as, e.g., "Amikake Pattern" fields.

As is well known in the art, amikake patterns are generally rectangular-type shading patterns that are placed over characters to emphasize or bring attention to those specific characters in a Japanese language document. Although only an exemplary amikake pattern field has been shown in specific data structure 328, it should be understood that any number of additional fields can be added while adjusting the version number for those additions. Consequently, as additional features are presented in external files, such as external file 210, translator 208 is able to read the version number and thereby know how many fields are present in a particular specific data structure 328, and additionally the nature of its contents.

Also illustrated as part of enumerated value list 322, is TableInfo, TableLineInfo, and TableCellInfo values which correspond to specific data structures 330, 332 and 334 respectively. As described above, these specific data structures contain a number of fields which allow translator 208 to properly interpret the data in external file 210 during a data transfer. As illustrated, specific data structure 330 contains a table bound field, specific data structure 332 contains a line start field and a line end field, and specific data structure 334 contains a cell bounds field. Of course, these fields are merely exemplary, and each specific data structure will also preferably contain version information.

For illustration purposes, the following are exemplary parameter block data structures 206 for importing and exporting data respectively.

| Import Parameter Block | | StringPtr | footnoteText; |
|---|---|---|---|
| struct ImportParmBlock | | Boolean | rulerShowing; |
| { | | Boolean | doubleSided; |
| uchar | *textBuffer; | Boolean | titlePage; |
| short | directive; | Boolean | endnotes; |
| OSErr | result; | Boolean | showInvisibles; |
| long | textLength; | Boolean | showPageGuides; |
| short | translatorState; | Boolean | showPictures; |
| short | refNum; | Boolean | autoFootnotes; |
| short | txtFace; | Point | pagePoint; |
| short | txtSize; | Point | datePoint; |
| short | txtFont; | Point | timePoint; |
| short | txtColor; | Handle | globalHandle; |
| short | txtjust; | Boolean | smartQuotes; |
| short | unused1; | Boolean | fractCharWidths; |
| ParaFormat | *paraFmts; | short | hRes; |
| TabSpec | *tabs; | short | vRes; |
| Boolean | unused2; | Rect | windowRect; |
| char | numcols; | SFReply | theReply; |
| short | currentStory; | TransDescribe | thisTranslator; |
| long | miscData; | ParmBlockExt | ext; |
| short | storyHeight; | long | extendedDataType; |
| unsigned char | decimalChar; | void | *extendedData; |
| Boolean | autoHyphenate; | }; | |
| THPrint | printRecord; | | |
| short | startPageNum; | | |
| short | startFootnoteNum; | | |

| Export Parameter Block | | short | startFootnoteNum; |
|---|---|---|---|
| struct ExportParmBlock | | Boolean | rulerShowing; |
| { | | Boolean | doubleSided; |
| char | directive; | Boolean | titlePage; |
| OSErr | *result; | Boolean | endnotes; |
| short | *refNum; | Boolean | showInvisibles; |
| long | *textLength; | Boolean | showPageGuides; |
| Handle | globalHandle; | Boolean | showPictures; |
| long | reserved1; | Boolean | autoFootnotes; |
| Handle | textBuffer; | Boolean | footnotesExist; |
| short | *txtFace; | THPrint | printRecord; |
| short | *txtSize; | Point | pagePoint; |
| short | *txtFont; | Point | datePoint; |
| char | *txtColor; | Point | timePoint; |
| short | *txtjust; | Boolean | smartQuotes; |
| ParaFormat | *paraFmts; | Boolean | fractCharWidths; |
| TabSpec | *tabs; | short | hRes; |
| PicHandle | thePicture; | short | vRes; |
| Rect | pictRect; | Rect | windowRect; |
| short | headerStatus; | SFReply | theReply; |
| short | footerStatus; | TransDescribe | thisTranslator; |
| short | currentStory; | Boolean | autoHyphenate; |
| short | numCols; | ParmBlockExt | ext; |
| Fixed | topMargin; | long | extendedDataType; |
| Fixed | bottomMargin; | void | *extendedData; |
| Fixed | leftMargin; | }; | |
| Fixed | rightMargin; | | |
| Fixed | gutter; | | |
| long | totalCharCount; | | |
| long | footnoteOffset; | | |

-continued

| | |
|---|---|
| StringPtr | footnoteText; |
| short | startPageNum; |

ExtendedDataType
Enumerated Value List

```
enum ExtendedDataType
{
kNilData = 0
kValidPrintRecord,
kvalidDocLength,
kExtendedDocInfo,
kExtendedStyleInfo,
kTableInfo,
kTableLineInfo,
kTableCellInfo
};
```

The following data structures are exemplary specific data structures 326, 328, 330, 332 and 334 as described with reference to FIG. 3.

ExtendedStyleInfo
Specific Data Structure

| typedef struct JExtendedStyleInfo | |
|---|---|
| { | |
| ExtendedDataVersion | dataVers; |
| NXFixed | tracking; |
| NXRGBColor | rgbTextcolor; |
| NXAmikakePattern | amipattern; |
| NXRGBColor | rgbAmicolor; |
| NXAmiwakuStyle | amiwaku; |
| NXRGBColor | rgbAmiwakuColor; |
| NXAuxStyleData | auxStyleData; |
| unsigned long | extraStyleBits1; |
| }JExtendedStyleInfo; | |

ExtendedDocInfo
Specific Data Structure

| typedef struct JExtendedDocInfo | |
|---|---|
| { | |
| ExtendedDataVersion | dataVers; |
| RulerUnit | rulerUnits; |
| KinsokuMode | kinsokuSetting; |
| NXFixed | docScale; |
| Boolean | sideBySideDisplay; |
| Boolean | docIsvertical; |
| }JExtendedDocInfo; | |

TableInfo
Specific Data Structure

| typedef struct JTableInfo | |
|---|---|
| { | |
| ExtendedDataVersion | dataVers; |
| NXFixedRect | tableBounds; |
| Boolean | tableAutogrow; |
| }JTableInfo; | |

TableLineInfo
Specific Data Structure

| typedef struct JTableLineInfo | |
|---|---|
| { | |
| ExtendedDataVersion | dataVers; |
| NXFixedPoint | lineStart; |
| NXFixedPoint | lineEnd; |
| NXFixed | lineSize; |

-continued

| | |
|---|---|
| NXLineStyle | lineStyle; |
| NXRBColor | lineColor; |
| }JTableLineInfo; | |

TableCellInfo
Specific Data Structure

| typedef struct JTableCellInfo | |
|---|---|
| { | |
| ExtendedDataVersion | dataVers; |
| NXFixedRect | cellBounds; |
| NXFixedRect | cellTextBounds; |
| NXRGBColor | cellColor; |
| NXCellPattern | cellPattern; |
| NXCellDiagonal | cellDiagonalLine; |
| NXFixed | diagonalWidth; |
| NXCellTextAlign | cellTextAlign; |
| NXCellTextDirection | cellTextDirection; |
| }JTableCellInfo; | |

Figure 4:
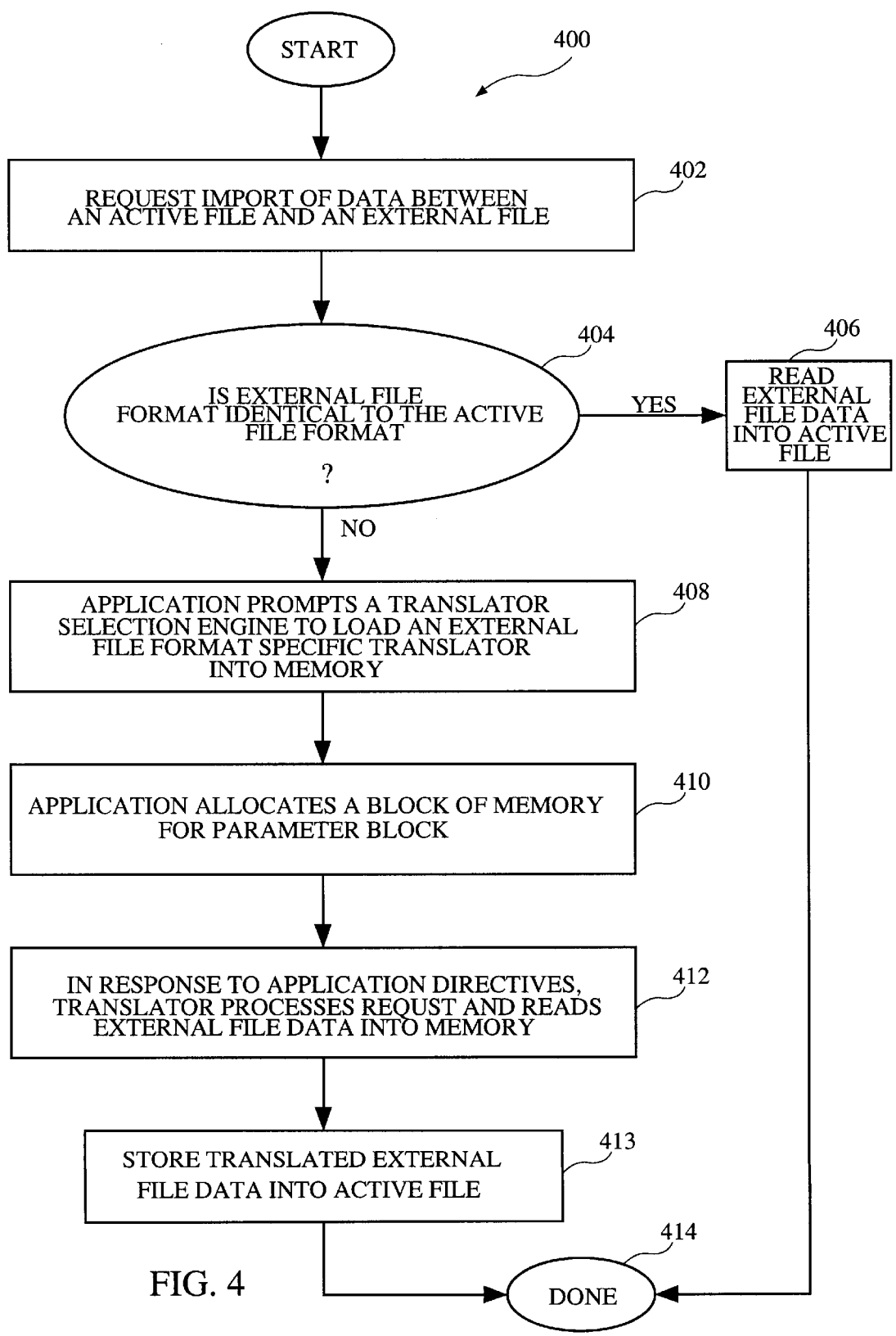
FIG. 4 is a flow chart diagram illustrating the process operations associated with transferring data between files having different formats in accordance with a preferred embodiment of the invention.

FIG. 4 is a flow chart diagram 400 illustrating the process operations associated with transferring data between files having different formats in accordance with a preferred embodiment of the invention. By way of example, the operations are preferably suited for importing or exporting data in or out of an external file that was created by an application which is different from the application which created an active file. For ease of illustration, the following flow chart operations will be described with reference to an "importation of data" from an external file 210 and into an active file 203 as shown in FIG. 2A. However, it should be understood that the following operations are analogous to operation performed during an "exportation of data" from an active file 203 and into an external file 210 of FIG. 2A.

The process begins at a block 402 where application 202 requests an importation of data between an active file 203 and an external file 210. Once an import of data between active file 203 and external file 210 is requested in block 402, the process proceeds to a decision block 404 where it is determined whether the external file 210 format is identical to the active file 203 format. If the external file 210 format is identical to the active file 203 format, the process proceeds to a block 406 where the external file 210 data is directly imported into the active file 203 without the need for implementing translators. Therefore, if the formats are the same, the process will proceed to a block 414 where the process of importing data is done.

On the other hand, if the external file format is not identical to the active file format, the process will proceed to a block 408 where the application prompts a translator selection engine 222 to load a translator into RAM 204 that is specific to the format of external file 210. In this manner, translator 208 will understand the internal structure of external file 210. As described above, translators are typically stored on a computer hard drive, floppy disk, disk drives or on any suitable storage medium.

Thus, once the translator selection engine 222 selects a suitable translator 208, the selected translator is loaded into RAM 204 as shown in FIG. 2A. As is well known in the art, the executable code of translators is generally within Code Resources for the Apple Computer, Inc. Macintosh format and dynamic link libraries (DELLS) for the Microsoft, Inc. Windows™ format. Once the selected translator has been loaded into RAM 204, the process will proceed to a block 410 where the application allocates a block of memory for a parameter block 206. By way of example, as shown in FIG.

3, parameter block 206 will preferably have a directive field, standard fields, and an extended field.

Once a block of memory has been allocated for parameter block 206, the process will proceed to a block 412 where in response to directives (i.e., messages requesting that certain types of data be transferred) set by application 202, translator 208 will process the directives and extract the requested data from external file 210 and read it into RAM 204. By way of example, when the application requests a specific type of data (e.g., a header element) to be imported from external file 210, the application will set a directive in parameter block 206 which indicates that a header element is requested. Thus, when translator 208 references the directive in parameter block 206, it will know the type of data to retrieve from external file 210.

If the data requested by application 202 requires the transfer of extended data, translator 208 will allocate memory 212 in RAM 204 for a specific data structure (e.g., specific data structures of FIG. 3) suited for receiving the extracted extended data from external file 210. The translator 208 will then set the POINTER FIELD to specify the location in allocated memory 212 where the extracted data is placed. Next, the translator 208 will set the directive field of parameter block 206 to ImportAcknowledge, which notifies application 202 that translator 208 was successful in its importation task.

Control then passes to application 202 where the data stored in allocated memory 212 is read by application 202 by referring to the POINTER FIELD set by translator 208. In this case, the data is directly read by application 202 via data path 211. Once application 208 has retrieved the data from allocated memory 212, the process proceeds to a block 413 where the data is stored into active file 203. The process now proceeds to a block 414 where the process is done.

Figure 5A:
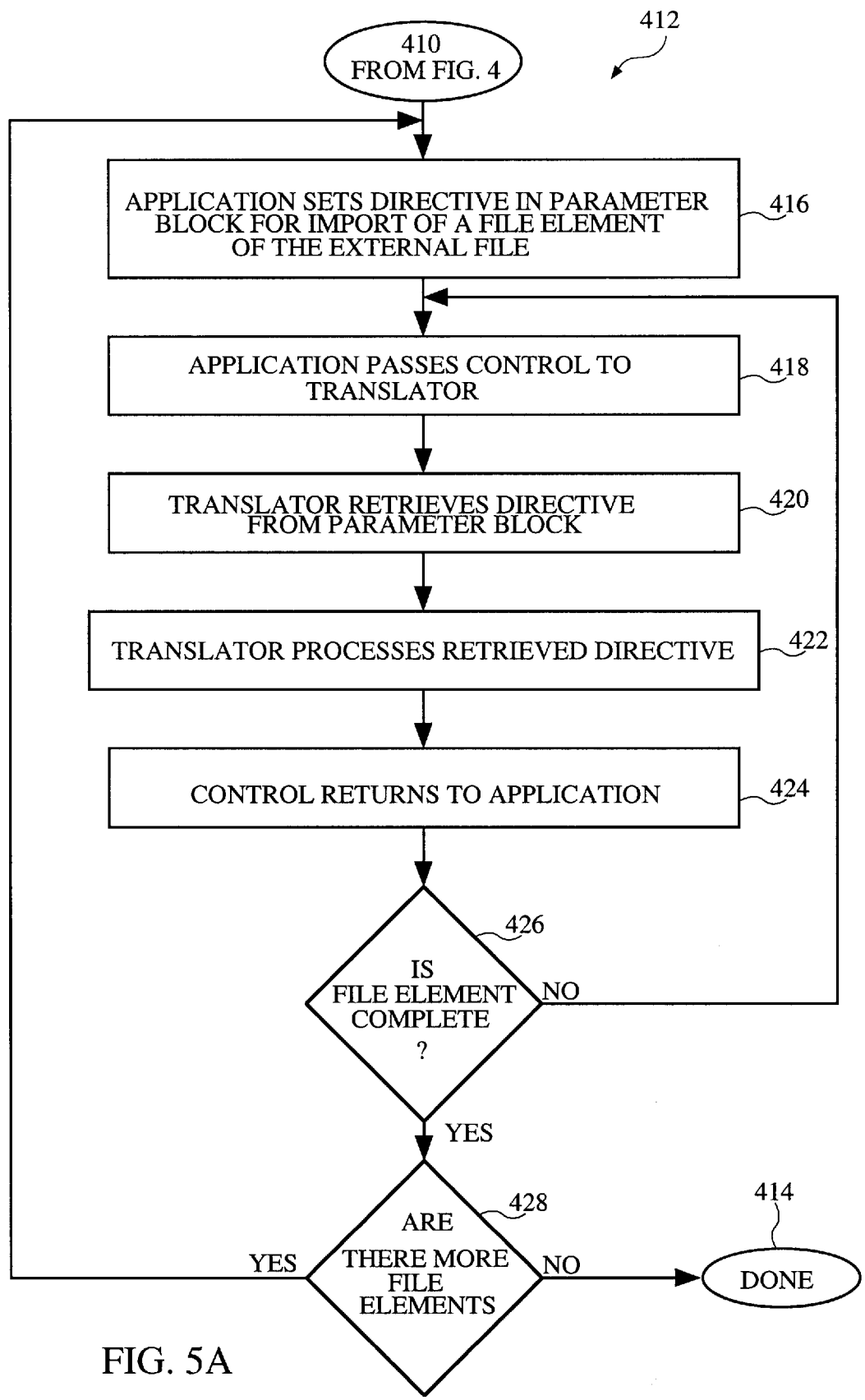
FIG. 5A is a more detailed flow chart illustrating various operations associated with processing importation directives in accordance with a preferred embodiment of the invention.
Figure 5B:
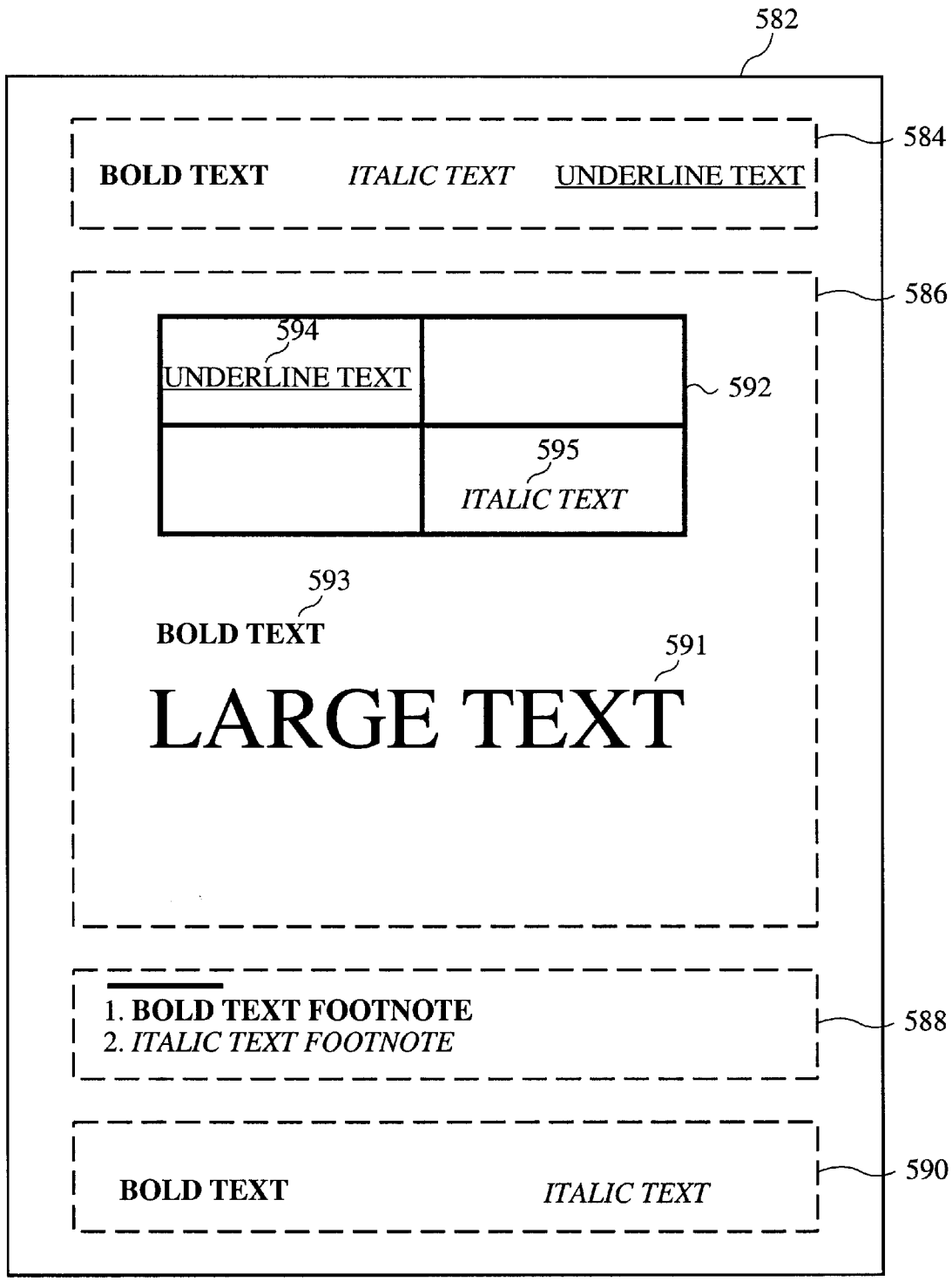
FIG. 5B shows an exemplary external file having a plurality of discrete elements of data in accordance with a preferred embodiment of the invention.

FIG. 5A is an exploded view of block 412 which provides a more detailed description of the operations associated with processing importation directives. Therefore, from block 410 of FIG. 4, the process will proceed to a block 416 where application 202 sets a directive in parameter block 206 indicative of a request for the importation of a specific element of data from external file 212. For ease of illustration, reference is now concurrently made to FIGS. 5A and 5B. FIG. 5B shows an exemplary external file 582 having a header element 584, a body element 586, a footnote element 588, and a footer element 590.

Broadly speaking, data transfers are generally carried out in a number of runs for each element of data. Therefore, for any given element of data, various data transfers will be made until all of the sub-elements in that element of data have been performed. Once all of the runs have been completed for that given element of data, another data transfer can begin for a new element of data.

By way of example, for header element 584, there may be any number of sub-elements that need to be transferred. As illustrated, there are three exemplary sub-elements in header element 584. The sub-element are shown as a bold text, an Italic text, and an underline text. Body element 586 is shown having a LARGE text 590, a bold text 593, a table 592 having an Italic text, and an underline text. Footnote element 588 is shown having a bold text footnote and an Italic text footnote. Finally, footer element 590 has a bold text and an Italic text.

As shown above, for plain text, each sub-element is distinguished by its style, and each identifiable style is generally transferred during a discrete data transfer run. On the other hand, when an element of data contains information other than plain text, e.g., tables data, each feature associated with the table will be transferred as a sub-element. In other words, since table data includes a number of sub-elements, only one table sub-element will be transferred during each run.

Reference is now drawn to block 416 of FIG. 5A where application 202 sets a directive (i.e., message) in parameter block 206 requesting the import of an element of data from external file 210. By way of example, if application 202 wants to import header element 584 of FIG. 5B, application 202 will set an "ImportInitHeader" directive followed by an "ImportGetText" directive which lets translator know that the text in header element 584 is being requested. At this point, the process proceeds to a block 418 where application 202 passes control to translator 208. The process now proceeds to a block 420 where translator 208 retrieves the directive set by application 202 in parameter block 206.

Once translator 202 retrieves the directive from parameter block 206, the process proceeds to a block 422 where translator 208 processes the retrieved directive. As will be described in greater detail with reference to FIG. 6 below, at this stage in the process, translator 202 will determine whether the directive is an "extended data" directive or a "standard directive."

Now, if the directive set by application 202 is requesting extended data, translator 208 will place a directive specific data structure in allocated memory 212 which lies in RAM 204. Translator 208 is now ready to begin extracting text from header element 584. Of course, translator will preferably extract one sub-element at a time, and place the extracted sub-element data into allocated memory 212. Translator 208 will now fill-in the TYPE FIELD indicating that header element 584 was returned, set the POINTER FIELD to reference the location in allocated memory 212 where the sub-element of data lies. Translator 208 will then set the directive field to ImportAcknowledge, indicating that the transfer of that sub-element was successful.

The process will now proceed to a block 224 where control returns to application 202. Application 202 now determines whether translator 208 set the directive field to ImportAcknowledge, and determines whether the type of data initially requested matches the received data by checking the TYPE HELD.

If application 202 did receive the type of data requested (e.g., header data), application 202 will use the POINTER FIELD set by translator 208 to reference the location in allocated memory 212 holding the extracted sub-element from external file 212. The process will now proceed to a decision block 426 where it is determined whether the data transfer for the current element is complete. In this example, the current element is header element 584 which still contains additional sub-elements such as Italic text and underline text. Accordingly, the process continues to operate through blocks 418, 420, and 424 until header element 584 is complete.

Once header element 584 is complete, the process will proceed to a block 428 where it is determined whether there are any more file elements within file 582 of FIG. 5B still requiring importation. By way of example, if file elements such as body element 586, footnote element 588 and footer element 590 are requested to be imported, the process will again return through blocks 416, 418, 420, 424, and 426. When all of the file elements have been processed as described above, and no more file elements are requested for importation, the process will proceed to block 414 where the process ends.

Figure 6:
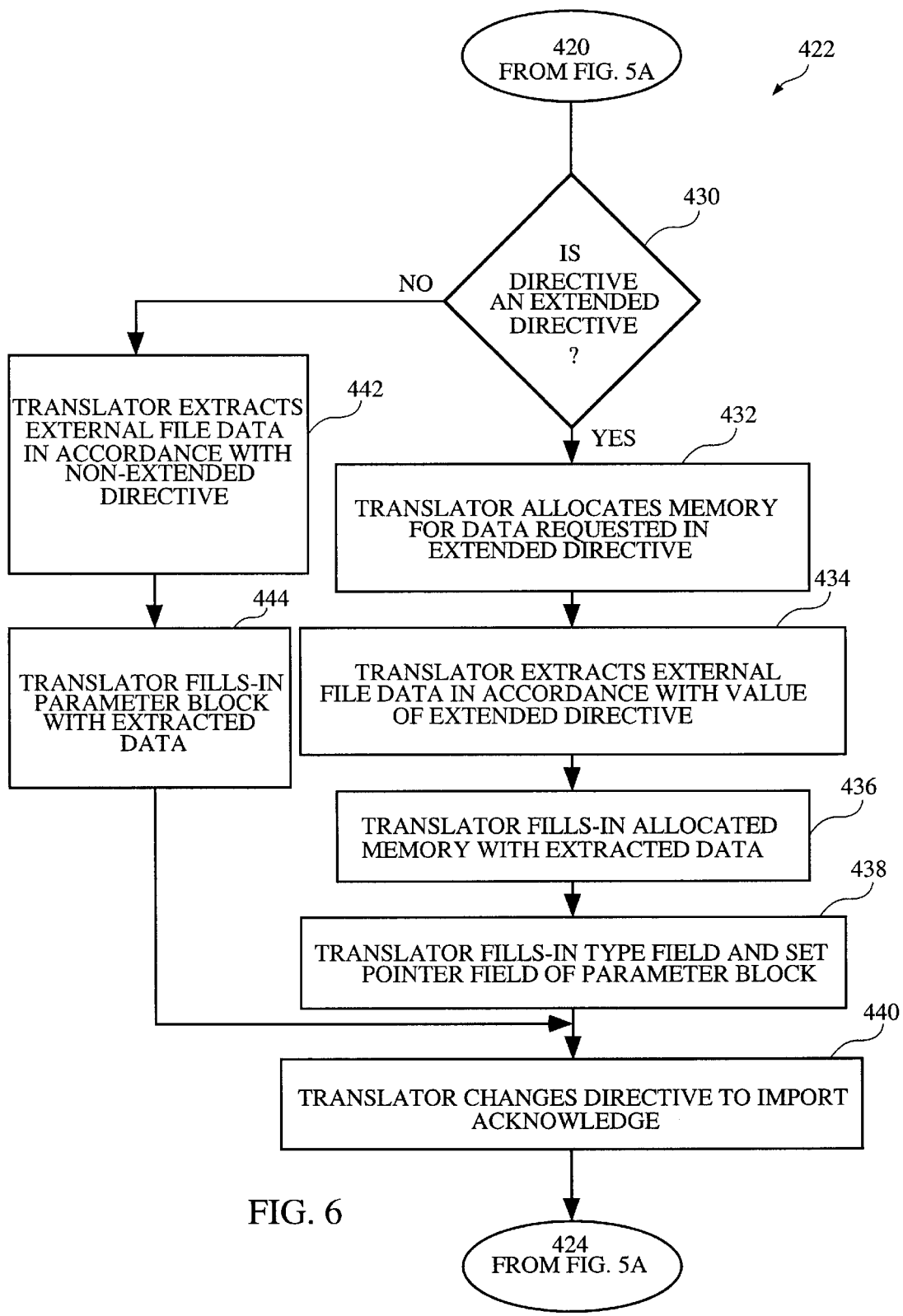
FIG. 6 is a more detailed flow chart illustrating various operations involved when a translator processes retrieved directives set by an application in accordance with a preferred embodiment of the invention.

FIG. 6 is a more detailed description of block 422 of FIG. 5A which describes the operations performed when translator 208 processes the directive set by application 202 from parameter block 206. From block 420 of FIG. 5A, the process proceeds to a decision block 430 where it is determined whether the directive set by application 202 is an extended directive. By way of example, application 202 will preferably send a directive which reads "ImportNewProtocol" (or "ExportNewProtocol" for exporting data) to determine whether translator 208 and application 202 support the necessary extended data types and capabilities. Generally, application 202 and translator 208 share information regarding their capabilities through "SupportFlag" data structures. The following is an exemplary data structure that may be used to identify whether application 202 and translator 208 share particular extended data capabilities.

---
SupportFlags Data Structure
---
typedef struct
{
Boolean sections;
Boolean sectionHdrFtrs;
Boolean extendedPicts;
Boolean eps;
Boolean movies;
Boolean styleSheets;
Boolean tables;
Boolean newStyles;
Boolean objectLayer;
}SupportFlags;
---

Reference is again drawn to FIG. 6. If it is determined that application 202 and translator 208 can handle extended data types, and an extended directive is set by application 202, the process will proceed to a block 432. In block 432, translator 208 allocates a block of memory 212 for a specific data structure that contains fields associated with the type of request made by translator 202. By way of example, as shown in FIG. 3, if ExtendedDocInfo. is requested, then a specific data structure 326 will be loaded into allocated memory 212.

Advantageously, loading only the needed specific data structure avoids having to load all of the specific data structures each time one is called. As described above, specific data structure 326 will preferably have version information 336 indicative of the number and types of fields contained within specific data structure 326. In this manner, future versions can be updated, and translator 208 will know the number and types of fields contained within each specific data structure.

The process will then proceed to a block 434 where the translator extracts the data requested from external file 210 in accordance with the version provided for the specific data structure loaded into allocated memory 212. Once the translator has extracted the data requested by application 202, the process will proceed to a block 436 where the translator fills-in selected fields in allocated memory 212 with the extracted data.

At this point, allocated memory 212 will contain the data extracted from external file 210. The process will then proceed to a block 438 where translator 208 fills-in the TYPE FIELD indicative of the type of data placed into allocated memory 212 and sets the POINTER FIELD in parameter block 206 to indicate the address location of the extracted data contained within allocated memory 212.

The process will then proceed to a block 440 where translator 208 sets the directive field to ImportAcknowledge which indicates that the data transfer requested by application 202 has been completed successfully. Of course if the data transfer is not successful, an error message will be set.

If it is determined in decision block 430 that the directive is not an extended directive, then the process will proceed to a block 442 where translator 208 will extract the external file data requested by the application in accordance with non-extended fields. For more information on the process associated with extracting data in accordance with non-extended fields, reference may be made to Appendix A which details the operations associated with importing and exporting non-extended data. Appendix A is a publicly available document that can be obtained from Apple Programmers' and Developers' Association (APDA), Apple Computer, Inc. of Cupertino, Calif.

Once the translator has extracted the external file data in block 442, the process proceeds to a block 444 where the translator fills-in the parameter block 206 fields with the extracted data. The process will then proceed to a block 440 where the translator changes the directive field to Import-Acknowledge indicating that the translator has provided the information requested by application 202. At this point, the process proceeds back to block 424 of FIG. 5A.

Figure 7:
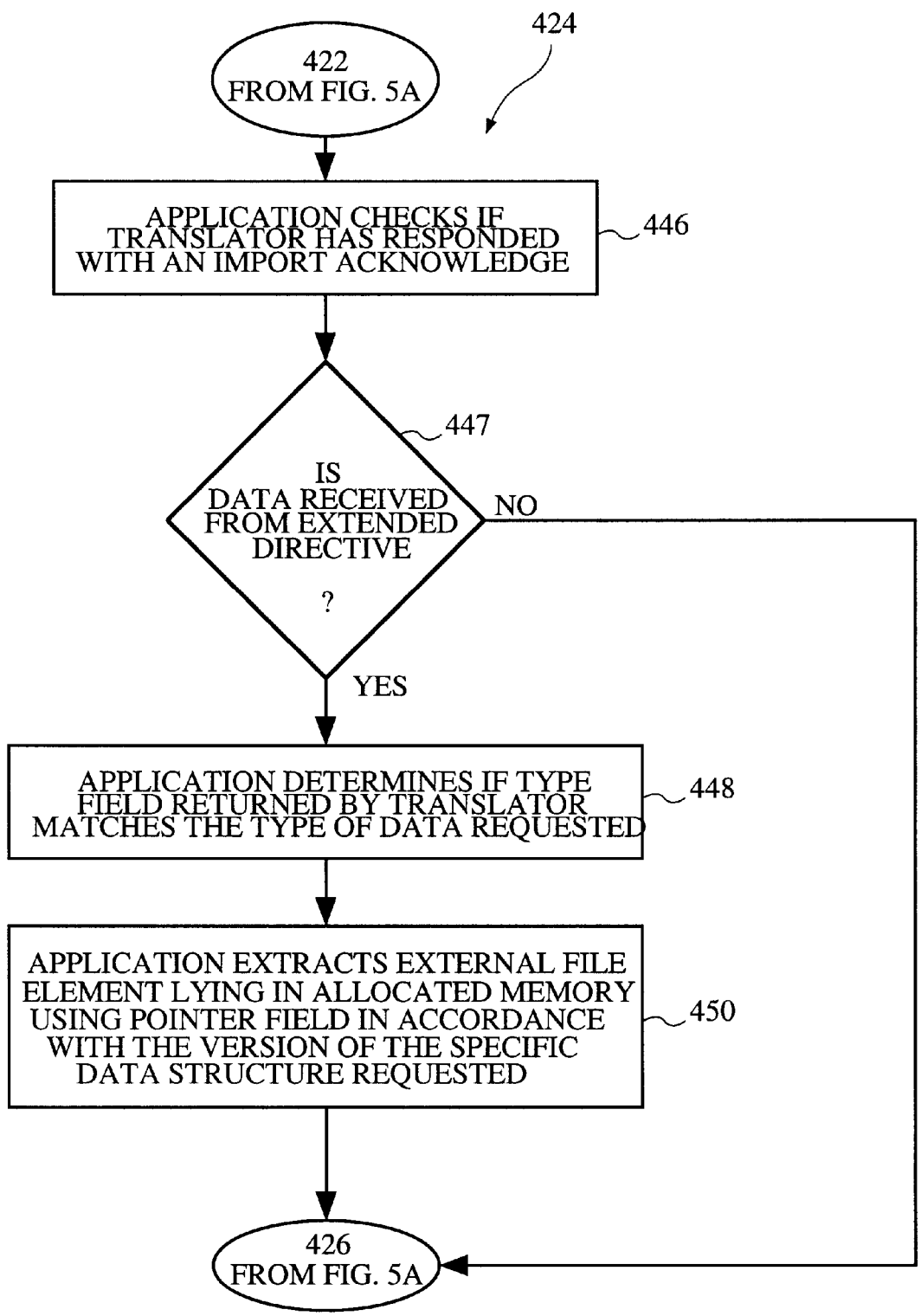
FIG. 7 is a more detailed flow chart illustrating various operations involved when control returns to an application after the translator processes a directive in accordance with a preferred embodiment of the present invention.

FIG. 7 is a more detailed description of block 424 of FIG. 5a which describes the operations involved when control returns to application 202. From block 222 of FIG. 5A, the process proceeds to a block 446 where application 202 determines whether translator 208 has responded with an import-acknowledge directive. If translator 208 had not responded with an import-acknowledge directive, an error would have been returned indicating that the transfer did not occur.

In this example, assuming that the data transfer was successful and that translator 208 set the directive field to ImportAcknowledge, the process will proceed to a decision block 447 where it is determined if the data received is from an extended directive. If it is determined that the received data is extended data, then the process will proceed to a block 448 where application 208 determines whether the TYPE FIELD set by translator 208 matches the type of data initially requested by application 202. In this operation, application 202 is essentially double checking that the received data is correct.

The process now proceeds back to block 450 where application 202 will extract external file 210 data lying in allocated memory 212 using the POINTER FIELD set by translator 208 in parameter block 206. As described above, application 202 will be extracting this information in accordance with the version of the specific data structure (e.g., specific data structures 326, 328, 330, 332, and 334 of FIG. 3) associated with the requested extended data. The process now proceeds back to block 426 of FIG. 5A where it is determined whether all of the sub-elements have been processed for the element of data being transferred.

On the other hand, if it is determined in block 447 of FIG. 7 that the data received is not extended data, the process will directly proceed to block 426 of FIG. 5A as described above.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 8:
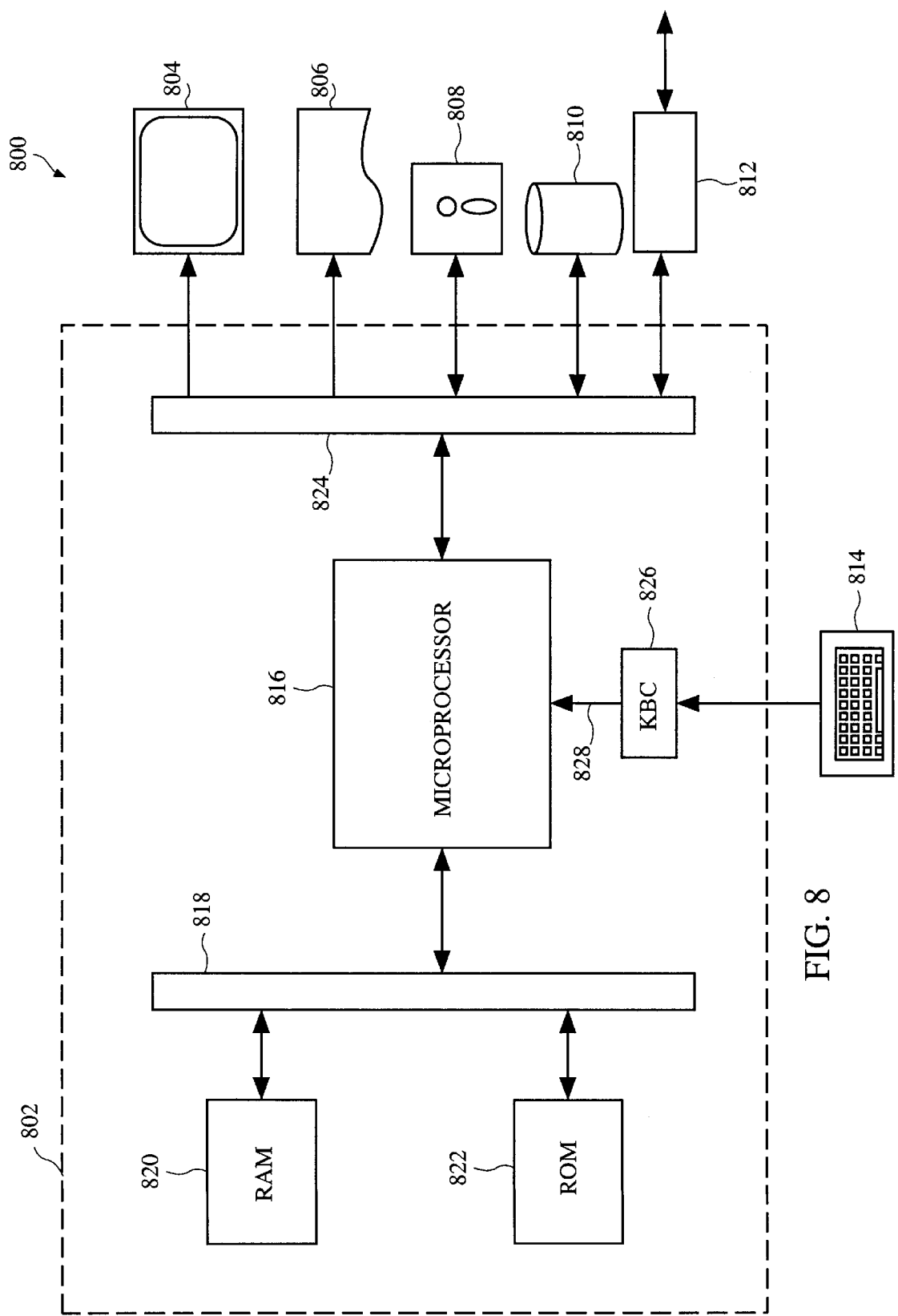
FIG. 8 is a block diagram of an exemplary computer system for carrying out the processing according to the invention.

FIG. 8 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to assist in the processing of data transfers between files.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 820. The computer code and data could also reside on a removable program medium and loaded or installed onto the computer system 800 when needed. Removable program mediums include, for example, CD-ROM, PC-CARD, floppy disk and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Broadly speaking, the operations described above may be implemented in any number of applications such as word processing, spread sheets, graphics, data base, page layout, etc.

Accordingly, the present embodiments are to be considered as illustrative and not restrictive, and the invention is not to be limited to the details given herein, but may be modified within the scope and equivalents of the appended claims.

What is claimed is:

1. An apparatus for transferring data between an active file being used by an application and an external file that is stored on a storage medium, the active file having a different format than the external file, the apparatus comprising:

a primary data structure including a plurality of standard fields and an extended field, at least some of the plurality of standard fields and the extended field being associated with an element of data to be transferred between the active file and the external file, the primary data structure further including a directive field, the directive field being set by the application when a data transfer is desired; and a translator configured to extract the element of data from one of the active file and external file in response to the directive field being set by the application, the translator operating in a standard mode to place the extracted data into the primary data structure, and the translator operating in an extended mode to allocate a secondary data structure and then place the extracted data into the secondary data structure;

wherein in the standard mode the application sets the directive field to use at least one of the plurality of standard fields, and in the extended mode the application sets the directive field to use the extended field.

2. The apparatus for transferring data as recited in claim 1, further comprising:
a de-allocator configured to disengage the secondary data structure when the element of data transferred between the active file and the external file has been completed in the extended mode.

3. The apparatus for transferring data as recited in claim 1, further comprising:
a mode capability directive set in the directive field by the application to determine the extended mode capabilities of the translator and the application.

4. The apparatus for transferring data as recited in claim 3, wherein a translator having extended mode capabilities communicates with the application using the extended field of the primary data structure.

5. The apparatus for transferring data as recited in claim 1, wherein random access memory is allocated for the primary data structure when the application requests a data transfer between the active file and the external file.

6. The apparatus for transferring data as recited in claim 1, wherein temporary random access memory is allocated for the secondary data structure when the application sets the directive field to use the extended field.

7. The apparatus for transferring data as recited in claim 1, further comprising:
a translator selection engine configured to select the translator in accordance with the format of the external file.

8. The apparatus for transferring data as recited in claim 7, wherein random access memory is allocated for the translator selected by the translator selection engine.

9. The apparatus for transferring data as recited in claim 1, wherein the element of data includes at least one sub-element of data.

10. The apparatus for transferring data as recited in claim 9, wherein each of said at least one sub-element of data is transferred during a different run.

11. The apparatus for transferring data as recited in claim 10, wherein each of said at least one sub-element of data identifies a characteristic of the data being transferred during the run.

12. The apparatus for transferring data as recited in claim 11, wherein each element of data is selected from the group consisting essentially of a header element, a footer element, a body element, a table element, a section element, a footnote element, a page number element, text element, and a formatting control element.

13. The apparatus for transferring data as recited in claim 11, wherein the characteristic of the data is selected from the group consisting essentially of a bold face text, an underline text, an italic text, a table line style, a table cell style, a text layout, and formatting data.

14. The apparatus for transferring data as recited in claim 1, wherein the extended field includes a type field and a pointer field, the pointer field locating the secondary data structure.

15. The apparatus for transferring data as recited in claim 14, wherein the type field is associated with a plurality of enumerated values, each of said plurality of enumerated values is in turn associated with a plurality of specific fields that are placed into the secondary data structure.

16. The apparatus for transferring data as recited in claim 14, wherein the pointer field identifies a specific random access memory address in the secondary data structure containing the element of data which the translator extracted and placed in the secondary data structure.

17. A process for transferring data between an active file being used by an application and an external file stored on a storage medium, the active file having a different format than the external file, the process comprising the operations of:
requesting a data transfer between the active file and the external file;
selecting a translator in response to the data transfer request, the translator being selected in accordance with the format of the external file;
allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;
extracting the element of data from one of the active file and external file in response to the directive field being set by the application;
placing the extracted element of data into a plurality of the standard fields of the primary data structure when in the standard mode;
allocating a secondary data structure and placing the extracted element of data into the secondary data structure when in the extended mode; and
de-allocating the secondary data structure when the element of data transferred between the active file and the external file has completed during when in the extended mode.

18. The process for transferring data as recited in claim 17, further comprising the operation of:
allocating random access memory for the primary data structure when the application requests a data transfer between the active file and the external file.

19. The process for transferring data as recited in claim 17, further comprising the operation of:
loading a translator selection engine to identify and load the translator specific to the format of the external file.

20. The process for transferring data as recited in claim 17,
wherein the element of data includes at least one sub-element of data,
wherein each of said at least one sub-element of data identifies a characteristic of the element of data being transferred,
wherein each element of data is selected from the group consisting essentially of a header element, a footer element, a body element, a table element, a section element, a footnote element, a page number element, a text element, and a formatting control element, and
wherein said method further includes the operation of transferring each of said at least one sub-element during a run.

21. The process for transferring data as recited in claim 17, wherein the extended field includes a type field and a pointer field.

22. A process for transferring data between an active file being used by an application and an external file stored on a storage medium, the active file having a different format than the external file, the process comprising the operations of:
requesting a data transfer between the active file and the external file;
selecting a translator in response to the data transfer request, the translator being selected in accordance with the format of the external file;

allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;

extracting the element of data from one of the active file and external file in response to the directive field being set by the application;

placing the extracted element of data into a plurality of the standard fields of the primary data structure when in the standard mode;

allocating a secondary data structure and placing the extracted element of data into the secondary data structure when in the extended mode; and determining the extended mode capabilities of the translator and the application when the application sets a mode determining directive in the directive field.

23. The process for transferring data as recited in claim 22, wherein the translator and the application communicate in the extended mode after the extended mode capabilities have been determined.

24. A process for transferring data between an active file being used by an application and an external file stored on a storage medium, the active file having a different format than the external file, the process comprising the operations of:

requesting a data transfer between the active file and the external file;

selecting a translator in response to the data transfer request, the translator being selected in accordance with the format of the external file;

allocating a primary data structure including a plurality of standard fields and an extended fields the plurality of standard fields and the extended field associated with an element of data to be transferred between the active file and the external file, the primary data structure further having a directive field that is set by the application when the data transfer is requested, the directive field being set in at least one of a standard mode and an extended mode;

extracting the element of data from one of the active file and external file in response to the directive field being set by the application;

placing the extracted element of data into a plurality of the standard fields of the primary data structure when in the standard mode;

allocating a secondary data structure and placing the extracted element of data into the secondary data structure when in the extended mode; and allocating temporary random access memory for the secondary data structure when performing a data transfer in the extended mode.

25. A process for transferring data between an active file being used by an application and an external file stored on a storage medium, the active file having a different format than the external file, the process comprising the operations of:

requesting a data transfer between the active file and the external file;

selecting a translator in response to the data transfer request, the translator being selected in accordance with the format of the external file;

allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;

extracting the element of data from one of the active file and external file in response to the directive field being set by the application;

placing the extracted element of data into a plurality of the standard fields of the primary data structure when in the standard mode;

allocating a secondary data structure and placing the extracted element of data into the secondary data structure when in the extended mode;

loading a translator selection engine to identify and load the translator specific to the format of the external file; and allocating random access memory for the translator selected by the translator selection engine.

26. A process for transferring data between an active file being used by an application and an external file stored on a storage medium, the active file having a different format than the external file, the process comprising the operations of:

requesting a data transfer between the active file and the external file;

selecting a translator in response to the data transfer request, the translator being selected in accordance with the format of the external file;

allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;

extracting the element of data from one of the active file and external file in response to the directive field being set by the application;

placing the extracted element of data into a plurality of the standard fields of the primary data structure when in the standard mode; and allocating a secondary data structure and placing the extracted element of data into the secondary data structure when in the extended mode, wherein the extended field includes a type field and a pointer field, and wherein the type field is associated with a plurality of enumerated values, each of said plurality of enumerated values is in turn associated with a plurality of specific fields that are placed into the secondary data structure.

27. A process for transferring data between an active file being used by an application and an external file stored on a storage medium, the active file having a different format than the external file, the process comprising the operations of:

requesting a data transfer between the active file and the external file;

selecting a translator in response to the data transfer request, the translator being selected in accordance with the format of the external file;

allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;

extracting the element of data from one of the active file and external file in response to the directive field being set by the application;

placing the extracted element of data into a plurality of the standard fields of the primary data structure when in the standard mode; and allocating a secondary data structure and placing the extracted element of data into the secondary data structure when in the extended mode, wherein the extended field includes a type field and a pointer field, and wherein the pointer field identifies a specific random access memory address in the secondary data structure containing the element of data which the translator extracted and placed in the secondary data structure.

28. A computer readable media containing program instructions for transferring data between an active file being used by an application and an external file stored on a storage medium, the active file having a different formal than the external file, said computer readable media comprising:

program instructions for requesting a data transfer between the active file and the external file;

program instructions for selecting a translator in response to the data transfer request, the translator being selected in accordance with the format of the external file;

program instructions for allocating a primary data structure including a plurality of standard fields and an extended field, the plurality of standard fields and the extended field associated with an element of data to be transferred between the active file and the external file, the primary data structure further having a directive field that is set by the application when the data transfer is requested, the directive field being set in at least one of a standard mode and an extended mode;

program instructions for extracting the element of data from one of the active file and external file in response to the directive field being set by the application;

program instructions for placing the extracted element of data into a plurality of the standard fields of the primary data structure when in the standard mode;

program instructions for allocating a secondary data structure and placing the extracted element of data into the secondary data structure when in the extended mode; and program instructions for de-allocating the secondary data structure when the element of data transferred between the active file and the external file has completed during when in the extended mode.

* * * * *